Dec. 3, 1935.    H. M. BIEBEL    2,023,116
RANGE CONTROL SYSTEM
Filed March 30, 1934
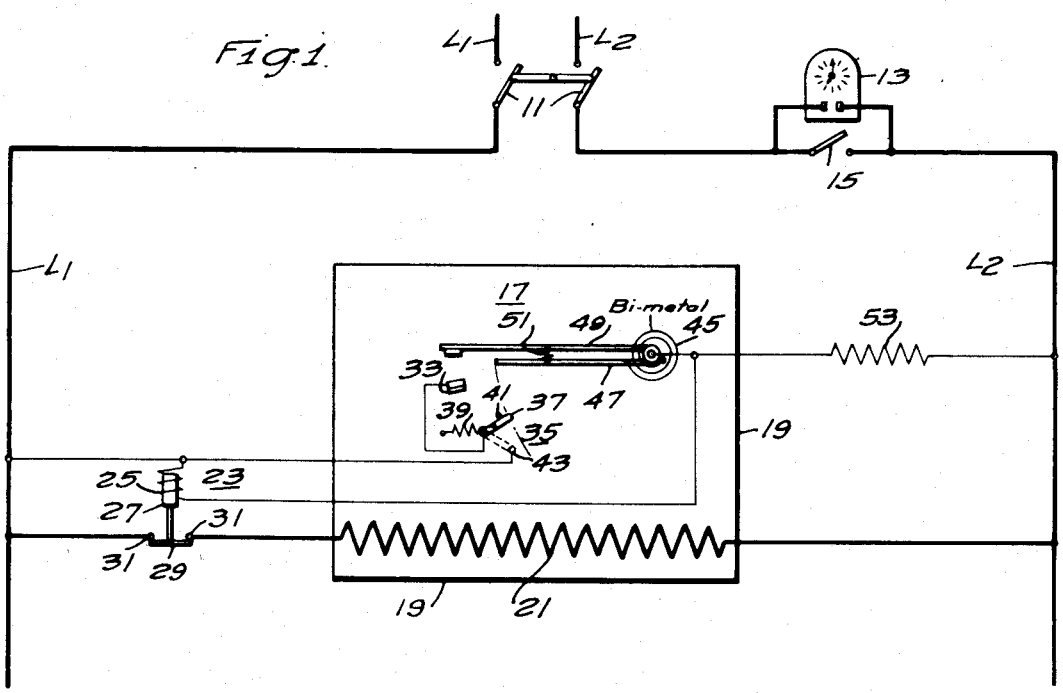
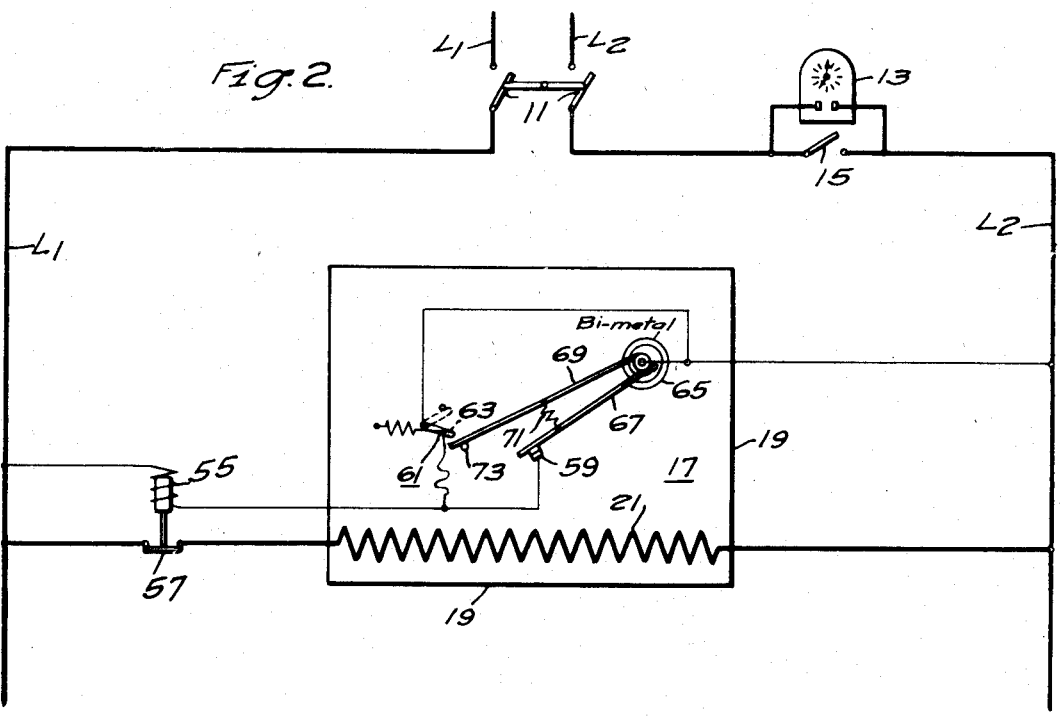
WITNESSES:
C. A. McCloskey
Wm. C. Groome
INVENTOR
Hermon M. Biebel.
BY
W. R. Coley
ATTORNEY Patented Dec. 3, 1935

2,023,116

UNITED STATES PATENT OFFICE 2,023,116

RANGE CONTROL SYSTEM

Herman M. Biebel, Oakmont, Pa., assignor to Westinghouse Electric & Manufacturing Company, East Pittsburgh, Pa., a corporation of Pennsylvania Application March 30, 1934, Serial No. 718,275

8 Claims. (Cl. 219—20)

My invention relates to electric ranges and more particularly to temperature control systems for range ovens.

An object of my invention is to provide a relatively simple, inexpensive, easily installed and operated thermo-electric control system for an electric range.

Another object of my invention is to provide a relatively simple control system to enable an operator to obtain either one of two different temperature cycles in the cooking chamber of an electric cooking device.

Other objects will either be pointed out specifically hereinafter or will be apparent from the following description of the elements of the system and of its operation.

As my improved system has a direct relation to the roasting of meats, it may be well to make a few general comments as to what is now considered to be the approved method for roasting meats. In general, the temperature is raised sufficiently high so that at least the surface portion of a roast is seared in order that the juices may be retained within the roast itself during the further cooking operation, after which the meat is subjected to a sustained lower temperature value. These different temperature values may be given, for illustrative purposes only, as on the order of 500° F. for the momentary peak temperature to effect searing of the meat while the lower continued temperature may be on the order of 300° F. However, both of these temperature values may be adjustable, and suitable means should be provided so that an operator may cause them to vary.

Other cooking operations may be better effected by using a maintained temperature only instead of a combined momentary peak temperature and then a continued lower temperature, this for instance being true in the case of boiling operations effected at about 212° F.

In practicing my invention, I provide a heating element for a cooking chamber, which heating element is sufficiently large so that the heat generated thereby will raise the temperature in the cooking chamber as well as the temperature of food placed therein to the maximum temperature desired, and I control the same by means of a single contactor. The contactor, in turn, is controlled by means of an adjustably mounted contact terminal or member and a two-position switch, the contact member and the switch cooperating with a thermally-actuable means responsive to variations in chamber temperature to effect the desired control of the heating element.

Reference is here made to my copending applications, relating to similar subject-matter, Serial Nos. 718,272, 718,273, 718,274, 718,276 and 718,277, and to an application by F. S. Wheeler Serial No. 718,278, filed of even date herewith.

In the single sheet of drawing,

Figure 1 is a diagrammatic representation of the elements of a system embodying my invention, and Fig. 2 is a similar view of a modified system embodying my invention.

Referring first to Fig. 1 of the drawing, I have there illustrated two conductors $L_1$ and $L_2$, constituting a supply circuit, and a main switch 11 which may be manually actuated by an operator to energize the system. As it may be desired to use a time control with my system, I provide a clock-controlled switch assembly 13, and where it is not necessary or desirable to use this time control, I provide another manually operable switch 15 connected in parallel circuit relation to device 13.

I have illustrated a cooking chamber 17 defined by oven walls 19 and having a heating element 21 associated therewith. As the details of design and construction of the oven walls and of the heating element constitute no part of my invention, they have been illustrated generally only and it is to be understood that any suitable or desired construction may be utilized in the practice of my invention.

The energization of heating element 21 is controlled by a contactor 23 which includes an actuating coil 25, a movable armature core 27 and a contact bridging member 29 operatively associated with armature 27 and movable therewith. Fixed contact members 31 are electrically connected together by the contact bridging member 29 to energize the heating element 21, the engagement of bridging member 29 with contacts 31 establishing a circuit from supply circuit conductor $L_1$ through the bridging member 29 and heating element 21 and from there to the second supply circuit conductor $L_2$. While I have illustrated a two-wire circuit, the system and device embodying my invention is not limited thereto as any suitable or desired source of electric energy may be utilized.

Means for controlling the contactor 23 includes a stop contact member 33 and a two-position manually and mechanically-actuable switch 35 which are shown as being located in the chamber of the oven, although this is not necessary. I prefer to make switch 35 of the quick or snap-acting type and have, therefore, shown it as including a blade or contact arm 37 pivotally mounted at one end thereof and having an overcenter spring 39 associated therewith to hold the blade in either the position shown by the full lines against a stop pin 41 or in its closed position as shown by the broken lines. Contact member 33 is connected to the pivot point of switch 35 and the contact member 43 is electrically connected by a suitable conductor to one terminal of the actuating coil 25, which terminal is also connected to supply circuit conductor L₁.

A thermally actuable means includes a bimetallic spiral 45 which is located either in the cooking chamber 17 or in such position relative thereto as to follow the variations of temperature in the cooking chamber. One end of bimetal spiral 45 is fixed on a suitable base (not shown) while the other end thereof is in operative engagement with a switch actuating arm 47. A second arm 49 is a contact arm and is mechanically connected to arm 47 by a spring 51. The two arms 47 and 49 are pivotally mounted on a suitable pivot pin on a base (not shown). The other terminal of actuating coil 25 is electrically connected to the pivot pin on which the two arms 47 and 49 may turn, or if desired to arm 49 only, and arm 49 is connected through a current-limiting resistor 53 to supply circuit conductor L₂.

Referring now to Fig. 2 of the drawing, I have there illustrated substantially the same cooking chamber 17, walls 19 and heating element 21. The energization of heating element 21 is controlled by a contactor 55 which is of substantially the same design and construction as hereinbefore set forth for contactor 23. The contact bridging member 57 cooperates in the usual manner with fixed contact members in the circuit of heating element 21 to control the circuit and thereby the energization of the heating element 21.

The control means for contactor 55 includes a stop contact member 59 and a two-position mechanically and manually actuable snap-acting switch 61 which may be of substantially the same kind as was hereinbefore described for switch 35. The movable end of the blade of switch 61 may engage a fixed contact member 63, and contact 63 and contact member 59 are electrically connected together and to one terminal of the actuating coil of contactor 55, the other terminal of the coil being connected to supply circuit conductor L₁.

A thermally actuable means cooperating with the stop contact member and the switch includes a bimetal element 65 located in heat-receiving relation relative to the cooking chamber 17 having one end thereof fixed on a suitable support (not shown) while the other end thereof engages a contact arm 67 which has one end thereof pivotally mounted on a support not shown in the drawing. A second arm 69 is provided which may turn on the same pivot as that on which contact arm 67 turns, the two arms being yieldingly connected together by a spring 71. The pivot point of switch 61 is connected by a suitable conductor not only to arm 67 but also to supply circuit conductor L₂.

The design and construction of the thermally-actuable means is such that the arms 67 and 69 will be turned in a clockwise direction by the thermal element upon increase of temperature thereof. The arm 69 is prevented from turning in a counter-clockwise direction by a stop pin 73 and can be turned in a clockwise direction away from the stop pin by the arm 67 moved by the bimetal spiral 65, when the temperature thereof approaches or exceeds say 500° F.

Referring now to Fig. 1 of the drawing, it is to be noted that the position of the thermally actuable means is that which it will occupy when the temperature in the cooking chamber 17 is relatively low, the position of the contactor being such that the heating element 21 is energized. The design and construction of the thermally-actuable control means is such that the arms 47 and 49 will turn in a counter-clockwise direction with increase of temperature. After a certain length of time, depending upon a number of factors, such as the heating capacity of element 21, the construction of the oven walls 19 and the amount of food located in the cooking chamber, the temperature in the cooking chamber and, therefore, of the bimetal element 45 will have increased to a certain value and as a result thereof, the two arms 47 and 49 will have been turned in a counter-clockwise direction. At a certain temperature, depending upon the adjustment of stop contact member 33, which value may for illustrative purposes be considered to be 300° F., contact arm 49 operatively engages contact member 33. However, as switch 35 is still in its open position, that shown by the full lines in the drawing, the engagement of arm 49 and contact member 33 will have no other effect than that of preparing a control circuit for the actuating coil 25. As the heating up of the cooking chamber and of the material therein progresses by reason of the continued energization of heating element 21, arm 47 will continue to be turned in a counter-clockwise direction by the effect of the thermal element 45 thereon, the spring 51 being placed under an increasing tension because arm 49 is prevented from any further turning movement in a counter-clockwise direction once it has engaged contact member 33. The design of arm 47 and of switch 35 is such that at a certain higher temperature, say on the order of 500° F., switch blade 37 is moved by arm 47 from its initial position to its second limiting position, namely, that shown by the broken lines. The control circuit for the actuating coil 25 is now complete whereby, as will be seen by an inspection of the diagram of Fig. 1, actuating coil 25 is short-circuited, the contactor opens its controlled circuit and the heating element 21 is thereby deenergized.

This has the result that the maximum or peak temperature will be maintained for a very short time only so that it may be called a momentary peak temperature value. As soon as the temperature in the cooking chamber and particularly the temperature of the thermal element 45 has decreased to a few degrees below 300° F., contact arm 49 will be disengaged from stop contact member 33 whereby the temporary short-circuit of actuating coil 25 is removed and the contact bridging member 29 is actuated to its closed position to thereby reenergize heating element 21.

The reenergization of heating element 21 is continued until such time as the temperature in the cooking chamber and particularly of the thermal element 45 has again been increased to a value of 300° F. or over, whereupon contact arm 49 will again engage contact member 33 to deenergize the contactor and the heating element. This operation will continue for as long as the energization of the system is continued, with the result that a substantially constant average value of temperature in the cooking chamber will be maintained to complete the cooking of the roast.

It will be noted that the arm 47 does not reengage snap switch 37 upon the return or clockwise movement of the arm as the oven cools from approximately 500° F. to approximately 300° F.

While in the system of Fig. 1 the actuating coil of contactor 23 is short-circuited to deenergize the same, in the system shown in Fig. 2 of the drawing the circuit of the actuating coil of contactor 55 is opened. The thermally actuable means is shown in the position which it will normally occupy when it and the oven chamber and any food located therein are at substantially room temperature. In this case, the turning movement of the thermally actuable means including a contact arm and a switch actuating arm is in a clockwise direction with increase of temperature. Switch 61 is normally in its closed position and it will be noted that two parallel paths are provided between supply circuit conductor L₂ through the thermally actuable means and from there to the actuating coil of contactor 55. One of these circuits is through contact arm 67 and stop contact member 59, while the other circuit is through switch blade 61 and contact 63.

After a period of energization of heating element 21, the temperature in the cooking chamber and particularly of the thermal elements 65 will have reached a value on the order of 300° F., whereupon arm 67 will be moved in a clockwise direction out of engagement with contact member 59. This disengagement will, however, have no effect upon the energizing circuit including the coil of contactor 55. At a certain higher temperature, say 500° F., arm 67 will move arm 69 and cause it to turn in a clockwise direction, finally resulting in a movement of switch blade 61 from its initial closed position to its open position shown by the broken lines in Fig. 2 of the drawing. The energizing circuit through the actuating coil of contactor 55 is now open; the contactor and the heating element are deenergized.

The temperature in the cooking chamber will now gradually decrease and the stop pin 73 will prevent appreciable turning movement of switch actuating arm 69 in a counter-clockwise direction but contact arm 67 is free to move under the influence of the thermal element 65 and at say 300° F. it again engages contact member 59, whereby contactor 55 is reenergized resulting in heating element 21 being again energized.

The contact arm 67 will continue to intermittently sequentially engage with and be disengaged from the contact member 59 in a manner well known in the art whereby a substantially constant average value of temperature in the cooking chamber will be maintained.

It will be noted that the arm 69 does not reengage snap switch 61 upon the return or counterclockwise movement of the arm as the oven cools from approximately 500° F. to approximately 300° F.

Let it be assumed that an operator wishes to obtain the maintained temperature cycle portion only, and that it is desired to operate at substantially 300° F., in which case no adjustment of stop contact members 33 or 59 need be made. If switch blade 37 in Fig. 1 of the drawing be turned manually to the position where it engages contact 43, the actuating coil of contactor 23 will be deenergized as soon as contact arm 49 engages contact member 33, which as was hereinbefore stated, may be at about 300° F. The same intermittent sequential energization and deenergization of the contactor and, therefore, of the heating element 21 will be effected as has already been set forth to maintain a substantially constant average temperature in the cooking chamber.

If the maintained temperature cycle is to be obtained by the use of the system shown in Fig. 2 of the drawing, switch blade 61 may be moved manually to its open position as shown by the broken line position of the blade so that as soon as contact arm 67 has been disengaged from contact member 59 by the action of the thermal element 65, the energizing circuit through the coil of contactor 55 is interrupted, the contactor and the heating element 21 being therefore also deenergized. The same intermittent sequential engagement and disengagement of arm 67 and contact 59 will continue as long as the system is energized, with the resultant energization and deenergization of heating element 21.

It will be noted, in general, that the system embodying my invention includes relatively simple and substantially standard means for obtaining either one of a plurality of temperature cycles, these means including what may be termed a standard contactor, a thermally actuable arm and a switch actuating arm, the two arms being resiliently connected together, with a two-position switch in circuit with the actuating coil of the contactor.

I may again state that my invention resides more particularly in the system rather than in the particular details of construction of the respective elements combined to make this system and for this reason I have deemed it unnecessary to illustrate in detail the constructions which I may use, as it is obvious that many changes may be made in the details of the various elements without departing from the spirit and scope of my invention. It is further desired that the invention be limited only by the prior art or by the appended claims.

I claim as my invention:

1. In an electric cooking appliance including a cooking chamber and a heating element therefor, means to control the energization of the heating element to obtain a momentary peak-temperature and then a maintained-lower temperature in the cooking chamber, said means including a contactor controlling the energization of the heating element, a two-position switch for governing said contactor, an adjustable contact member, a thermally-actuable contact arm movable in response to variations in chamber temperature to intermittently engage said contact member, an arm resiliently connected to the contact arm for actuating said switch, and electric connections including the switch, the contact member and the contact arm to prepare a control circuit for the contactor coil, the switch-actuating arm thereafter causing movement of the two-position switch to effect deenergization of the contactor coil and of the heating element at a peak temperature, and contact arm thereafter cooperating with the adjustable contact member, to intermittently sequentially energize and deenergize the contactor coil to maintain a lower average temperature in the cooking chamber.

2. In an electric cooking appliance including a cooking chamber and a heating element therefor, means for controlling the energization of the heating element to obtain a momentary peak temperature and then a maintained lower temperature in the cooking chamber, said means comprising a contactor controlling the energization of the heating element, a two-position switch for governing said contactor, a thermal element movable in response to variations in chamber temperature, an adjustable contact member, a contact arm for intermittently engaging said contact member and an arm for actuating said switch, said arms being resiliently connected together and moved by said thermal element, and electric connections between the contactor coil, the switch and the contact member, the switch-actuating arm under the influence of said thermal element moving the switch to a position to effect deenergization of the contactor coil and of the heating element at a certain peak temperature, the contact arm thereafter cooperating with the adjustable contact member to intermittently sequentially energize and deenergize the contactor coil and the heating element.

3. In an electric cooking appliance including a cooking chamber and a heating element therefor, means for obtaining a peak temperature and then a lower maintained temperature in the cooking chamber, said means including a contactor controlling the energization of the heating element, a two-position switch for governing said contactor, a contact member, electric connections between the contactor coil, the switch and the contact member, a contact arm for intermittently engaging said contact member, an arm for actuating said switch, resilient means connecting the two arms together, and a thermally-actuable member for actuating the two arms and movable in response to temperature variations in the cooking chamber, the two thermally-actuated spring-connected arms cooperating respectively with the contact member and the switch to control the contactor and the heating element to cause deenergization of the contactor at a certain peak temperature in the cooking chamber, the contact arm thereafter cooperating with the contact member to intermittently sequentially energize and deenergize the heating element to obtain a lower maintained temperature in the cooking chamber.

4. In an electric cooking appliance including a cooking chamber and a heating element therefor, means for obtaining a momentary peak temperature and then a lower maintained temperature in the cooking chamber, said means including a contactor controlling the energization of the heating element, a two-position switch for governing said contactor, a contact member, a circuit including the contactor coil, the switch and the contact member, and thermally-actuable means moved in response to variations in chamber temperature and cooperating with the switch to cause deenergization of the contactor coil and of the heating element at the desired peak temperature, the thermally-actuating means thereafter cooperating with the contact member, to intermittently sequentially energize and deenergize the contactor coil and the heating element to maintain a desired lower temperature in the cooking chamber.

5. In an electric cooking appliance including a cooking chamber and a heating element therefor, means for obtaining a momentary peak temperature and then a lower maintained temperature in the cooking chamber, said means including a contactor controlling the energization of the heating element, a two-position switch for governing said contactor, a contact member, a circuit including the contactor coil, the switch and the contact member, and thermally-actuable means moved in response to variations in chamber temperature for operatively engaging the contact member at the lower maintained temperature value in the cooking chamber and effecting operation of the switch at the peak temperature to cause deenergization of the heating element, the thermally-actuable means thereafter cooperating with said contact member to intermittently sequentially energize and deenergize the contactor coil and the heating element to maintain the lower temperature in the cooking chamber.

6. In an electric cooking appliance including a cooking chamber and a heating element therefor, means for obtaining a momentary peak temperature and then a lower maintained temperature in the cooking chamber, said means including a contactor controlling the energization of the heating element, a two-position initially open switch for governing said contactor, a contact member, a circuit including the contactor coil, the switch and the contact member, and thermally-actuable means moved in response to variations in temperature of the chamber for operatively engaging the contact member at substantially the lower maintained temperature value and effecting closing of the switch at the peak temperature to cause deenergization of the contactor coil and of the heating element, said thermally-actuable means thereafter cooperating with the contact member to intermittently sequentially energize and deenergize the contactor coil and the heating element to maintain the lower temperature in the cooking chamber.

7. A device as set forth in claim 6 characterized by the contactor being normally open to effect de-energization of the heating element and thermally-actuable means intermittently engaging the contact member during the maintained temperature portion of the cycle to effect short-circuiting of the contactor coil to cause intermittent opening of the circuit controlled by the contactor.

8. In an electric cooking appliance including a cooking chamber and a heating element therefor, means for controlling the heating element to obtain the one or the other of two different temperature cycles in the cooking chamber, said means including a contactor controlling the energization of the heating element, a two-position switch for governing said contactor, a contact member, electric connections between the contactor coil, the switch and the contact member, and thermally-actuable means movable in response to variations in the temperature of the cooking chamber, to cooperate in a certain sequence with the contact member and the switch to cause deenergization of the contactor coil and the heating element with the two-position switch in one of its positions and to cooperate with the contact member to intermittently sequentially energize and deenergize the contactor coil and the heating element to obtain a maintained lower temperature in the cooking chamber with the two-position switch remaining in its same position.

HERMAN M. BIEBEL.